United States Patent Office 3,440,494
Patented Apr. 22, 1969

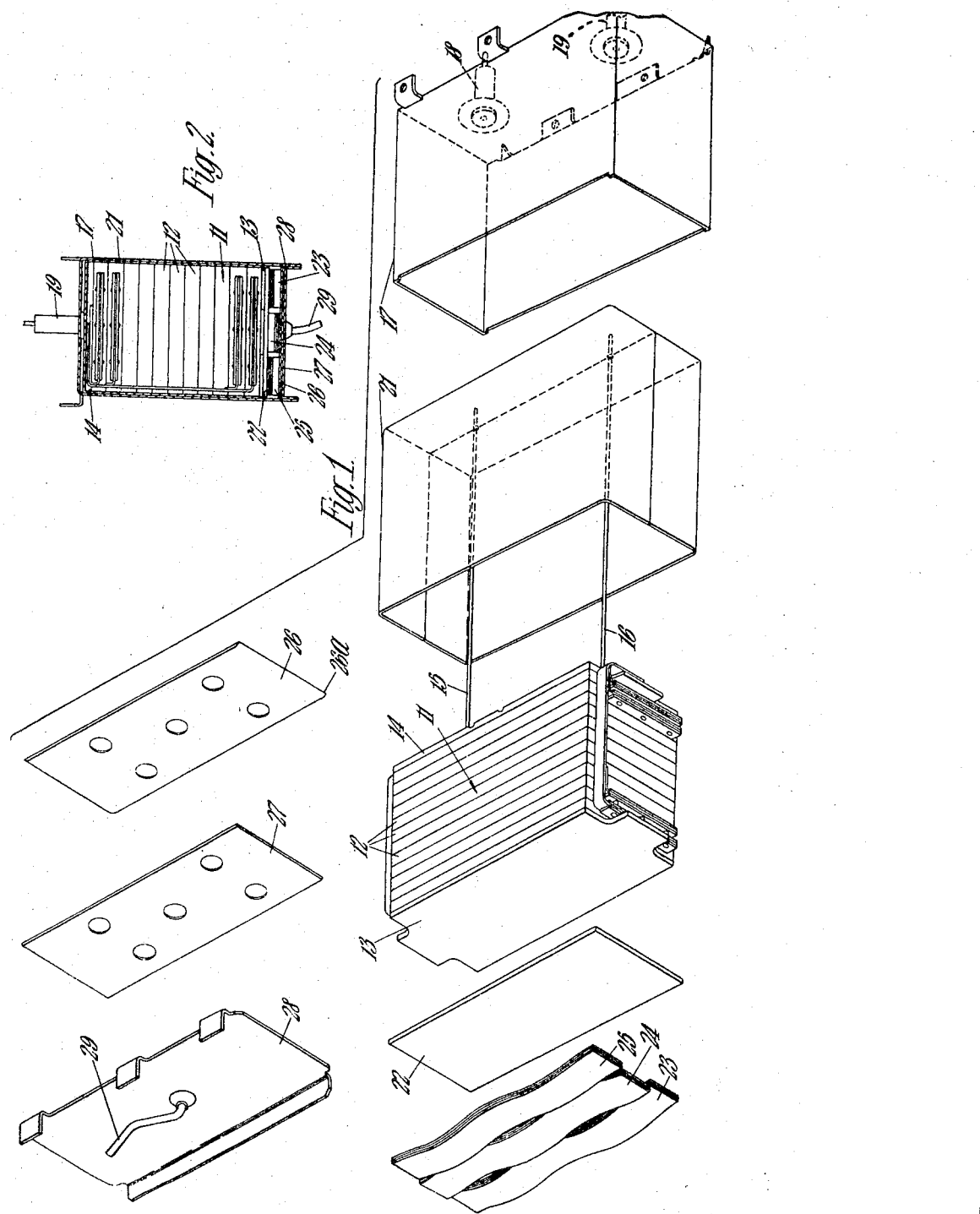

3,440,494
CAPACITOR COMPRISING A SEALED HOUSING AND PRESSURE MAINTAINING MEANS ON STACKED UNIT THEREIN
Eric Wade, Watford, England, assignor to Rotax Limited, London, England, a British company
Filed Feb. 3, 1966, Ser. No. 524,891
Claims priority, application Great Britain, Feb. 4, 1965, 4,835/65
Int. Cl. H01g 9/08
U.S. Cl. 317—230                    3 Claims

ABSTRACT OF THE DISCLOSURE

The capacitor unit includes a capacitor stack housed within a container slidable in a sealed housing. Terminals are supported on the exterior of the housing and are electrically connected within the housing to the capacitor stack. Resilient means act between a wall of the housing and the stack to resist movement of the stack relative to the housing and the walls of the housing include outwardly bulged portions which increase the volume of the housing.

---

This invention relates to capacitor units, particularly for use in aircraft ignition systems where the unit may be submitted to high temperatures.

A typical capacitor for use at high temperature consists of a pack of conductive plates in face-to-face relationship but separated by dielectric material. The plates may be separate, in which case alternate plates are connected to one terminal and the intervening plates to a second terminal. Alternatively, the plates may be constituted by parts of two conductive strips which are interleaved. In this case only one terminal need be connected to each strip. A suitable material for the dielectric is isomica, which exhibits nonisotropic properties in that its expansion perpendicular to its plane is very large with respect to its expansion in its plane. Thus, if a pack of plates is formed as described, the pack will when heated expand in a direction perpendicular to the planes of the plates. Throughout this specification the expression "capacitor stack" is used to mean a capacitor consisting of one or more packs of the kind specified in this paragraph in which the dielectric is isomica or some other dielectric material exhibiting similar nonisotropic properties.

A capacitor unit according to the invention comprises in combination a sealed housing having a capacitor stack therein, the housing having external terminals thereon connected to the capacitor stack, and resilient means acting between the stack and housing, the resilient means accepting forces resulting from expansion of the capacitor stack.

One example of the invention is illustrated in the accompanying drawings, wherein:

FIGURE 1 is an exploded view of a capacitor unit with the components shown in two rows for convenience, and FIGURE 2 is a sectional view of the assembled unit.

Referring to the drawings a capacitor stack 11 is formed by placing a number of preformed packs 12 between a pair of boards 13, 14 which are interconnected so that the packs are formed into a unit. The packs 12 are separated by their isomica spacers which are not shown in the drawings. The required connections are made within the stack, which incorporates a pair of external leads 15, 16.

There is further provided a metal housing 17 open at one end and having a pair of external terminals 18, 19 secured to its closed end, the terminals being insulated from the housing 17. In the housing is placed a container 21 open at one end and formed from silicon bonded glass. The container 21 is a sliding fit in the housing 17 and in its closed end, which is positioned adjacent the closed end of the housing 17, are a pair of holes aligned with bores extending through the terminals 18, 19.

The capacitor stack 11 is placed in the container 21 as a sliding fit, and the external leads 15, 16 are threaded through the holes in the container 21 and the bores in the terminals and then secured to the terminals. The container 21 is then filled with zirconium orthosilicate sand, impregnated with solventless silicone resin and cured at a high temperature.

An insulating board 22 is now placed on top of the capacitor stack, followed by three sets of sinusoidal springs 23, 24, 25 arranged with the convolutions of the springs 23, 25 in phase, and those of the spring 24 180° out of phase with the springs 23, 25. A plate 26 having curved ends 26a is placed over the springs, the ends 26a assisting in locating the springs. The plate 26 is followed by one or more shims 27 and finally a base plate 28 having an exhaust tube 29 extending therefrom. The base plate 28 is welded to the housing 17 to seal the housing, except for the exhaust tube 29, and before the welding operation the number of shims 27 is adjusted to pre-stress the springs 23, 24, 25 the required amount.

The capacitor unit is now placed in an oven at 250° C. and air at 50 p.s.i. blown in through the tube 29 to cause the sides of the housing 17 to bulge permanently. The unit is then removed from the oven, the air is replaced by nitrogen, and the tube 29 is then cut off and its edges secured to the plate to seal the housing. The primary reason for prestressing the housing to a permanent bulge is to provide a gas volume compatable with the free volume around the springs. Then, when the completed capacitor is heated the pack expands, the springs compress and the free gas around them is displaced into the bulge. Since the bulge capacity is now not small the pressure rise due to this displacement is not excessive. There will of course be further pressure rise due to the effects of temperature. The effect of this is that the final pressure rise is within safe limits and the case remains dimensionally comparably stable.

The purpose of the container 21 is to avoid adhesion between the stack 11 and housing 17, so that expansion can take place freely.

Having thus described my invention what I claim as new and desire to secure by Letters Patent is:

1. A capacitor unit for use in high temperature applications comprising in combination a sealed, generally cuboidal housing, a container received as a close, sliding fit in the housing, a capacitor stack secured within the housing, electrical terminals on the exterior of the housing, means electrically interconnecting the capacitor stack and said terminals, resilient means acting between the stack and one wall of the housing and outwardly bulged portions in the walls of the housing, said outwardly bulged portions providing volume within the housing into which gas within the housing can expand.

2. A capacitor unit as claimed in claim 1 wherein the stack is bonded into the container by a mixture of sand and silicone resin.

3. A capacitor unit as claimed in claim 1 wherein the free space within the unit contains nitrogen.

References Cited

UNITED STATES PATENTS

| | | | |
|---|---|---|---|
| 793,777 | 7/1905 | Fessenden | 317—242 |
| 1,833,392 | 11/1931 | Dubilier | 317—261 |
| 1,920,177 | 8/1933 | Bailey | 317—261 |
| 2,383,480 | 8/1945 | Heyman | 317—261 |
| 2,899,614 | 8/1959 | Pitley | 317—260 |

JAMES D. KALLAM, *Primary Examiner.*

U.S. Cl. X.R.
317—234, 244